United States Patent
Jiang et al.

(10) Patent No.: US 12,424,642 B1
(45) Date of Patent: Sep. 23, 2025

(54) PREDICTION METHOD OF ELECTROCHEMICAL AND MECHANICAL PERFORMANCES IN SOFC COLD AND HOT CYCLE

(71) Applicant: CHINA UNIVERSITY OF PETROLEUM (EAST CHINA), Qingdao (CN)

(72) Inventors: Wenchun Jiang, Qingdao (CN); Hongxiang Zheng, Qingdao (CN); Yun Luo, Qingdao (CN); Yazhou Shi, Qingdao (CN); Ming Song, Qingdao (CN); Shaohua Li, Qingdao (CN); Xiucheng Zhang, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 18/987,143

(22) Filed: Dec. 19, 2024

(30) Foreign Application Priority Data

Jul. 12, 2024 (CN) .......................... 202410933097.5

(51) Int. Cl.
H01M 8/04298 (2016.01)
H01M 8/043 (2016.01)
(Continued)

(52) U.S. Cl.
CPC ....... *H01M 8/04305* (2013.01); *H01M 8/043* (2016.02); *H01M 8/04559* (2013.01);
(Continued)

(58) Field of Classification Search
CPC ............. H01M 8/04305; H01M 8/043; H01M 8/04559; H01M 8/04649; H01M 8/04992; H01M 8/12; H01M 2008/1293
(Continued)

(56) References Cited

U.S. PATENT DOCUMENTS

2002/0120906 A1* 8/2002 Xia .................... G06F 30/00
716/132
2006/0074574 A1* 4/2006 Gasda ............... H01M 8/04895
702/63
(Continued)

OTHER PUBLICATIONS

First Office Action in Corresponding Chinese Application No. 202410933097.5, dated Aug. 22, 2024; 7 pgs.
Grant Notification in Corresponding Chinese Application No. 202410933097.5, dated Sep. 14, 2024; 3 pgs.
(Continued)

*Primary Examiner* — Christian Roldan
(74) *Attorney, Agent, or Firm* — HAUPTMAN HAM, LLP

(57) ABSTRACT

The present disclosure provides a prediction method of electrochemical and mechanical performances of a Solid Oxide Fuel Cell (SOFC) in a cold-hot cycle, and belongs to the technical field of SOFCs. In the present disclosure, a cold-hot cycle test is performed on SOFC pile, a polarization curve and an electrochemical impedance spectroscopy are measured by an electrochemical workstation, and contributions of different electrode reaction processes to voltage attenuation are analyzed quantitatively; the mechanical performance (bending strength, elastic modulus and hardness) after different numbers of cold-hot cycle services is tested, and based on change of Ni particles, the electrochemical performance and the mechanical performance of the SOFC pile are quantitatively associated; an attenuation coupling relationship of the electrochemical performance and the mechanical performance of the SOFC pile is disclosed and an attenuation theory model of the electrochemical performance and the mechanical performance of the SOFC pile is built. In this way, a change law of the electrochemical performance and the mechanical performance of the SOFC pile after different numbers of cold-hot cycles and a cold-hot cycle service life of the SOFC pile can be accurately predicted, which is of great significance to improve the
(Continued)

thermal shock resistance of the cold-hot cycles of the SOFC pile, so as to promote SOFC commercialization applications.

6 Claims, 8 Drawing Sheets

(51) Int. Cl.
    *H01M 8/04537*     (2016.01)
    *H01M 8/04992*     (2016.01)
    *H01M 8/12*     (2016.01)

(52) U.S. Cl.
    CPC ................ *H01M 8/04649* (2013.01); *H01M 8/04992* (2013.01); *H01M 8/12* (2013.01); *H01M 2008/1293* (2013.01)

(58) Field of Classification Search
    USPC ........................................ 429/400
    See application file for complete search history.

(56) References Cited

U.S. PATENT DOCUMENTS

2013/0093456 A1*   4/2013   Cheng .............. H01M 8/04552
                                                324/764.01
2019/0341638 A1*   11/2019   Kawabuchi ....... H01M 8/04228

OTHER PUBLICATIONS

Search Report in Corresponding Chinese Application No. 202410933097.5, dated Aug. 20, 2024; 7 pgs.

* cited by examiner

PREDICTION METHOD OF ELECTROCHEMICAL AND MECHANICAL PERFORMANCES IN SOFC COLD AND HOT CYCLE

RELATED APPLICATIONS

The present application claims priority from Chinese Application Number 202410933097.5, filed Jul. 12, 2024, the disclosure of which is hereby incorporated by reference herein in its entirety.

TECHNICAL FIELD

The present disclosure relates to the technical field of solid oxide fuel cells (SOFCs) and in particular to a prediction method of electrochemical and mechanical performances in SOFC cold and hot cycle.

BACKGROUND

Solid Oxide Fuel Cell (SOFC) is an electrochemical device capable of converting chemical energy in fuel into electric energy directly under high temperature condition. Due to it's the advantages of high efficiency, zero pollution and low noise and the like, it has wide application prospect in the fields such as distributed power generations and large-scale fixed power stations and the like. For the purpose of satisfying the requirements for long service life of the commercial applications, the SOFC is expected to run continuously under harsh operation conditions and undergo temperature cycle changes of multiple startups and shutdowns. In cold-hot cycle service of the SOFC piles, the electrode materials experience harsh working conditions, leading to formation of temperature gradient inside the pile and non-uniform temperature distribution. Due to mismatching of thermal expansion coefficients of the composition materials of the cells, excessive heat stress may be generated inside the cells. Due to the high hardness and brittleness of the ceramic materials and various shortcomings inside, the cells tend to deform, delaminate and crack open in such environment, significantly lowering the mechanical performance of the SOFC assembly and affecting the power generation performance and the operation life of the SOFC. Further, in the cold-hot cycle process, the nickel particles in the anode may suffer degradations such as coarsening, migration and depletion and the like, which not only lowers the conductivity and output voltage of the SOFC but also results in appearance of micro-cracks and defects inside the anode material, further lowering its bending strength and stability.

The mechanical strength and electrochemical stability of the cells is of critical significance for high reliability of the SOFC pile. But at present, there is a shortage of researches related to the mechanical performance and electrochemical performance of the SOFC pile. This is because such researches take much time and resources to carry out long-term investigations. Furthermore, it is very difficult to accurately identify the mechanism affecting the degradation of the SOFC pile because its decreased performances involve the weakening interactions of the various components of the pile and the degradation of the assemblies themselves. Therefore, in order to extend the service life of the SOFC and expand its application fields, it is necessary to systematically study the degradation law and coupling relationship of the electrochemical performance and the mechanical performance of the SOFC pile in the cold-hot cycle process to unveil its potential degradation mechanism. This is highly significant to improve the stability of the SOFC in the cold-hot cycle.

SUMMARY

The Solid Oxide Fuel Cell (SOFC) is an efficient energy conversion device capable of directly converting chemical energy in fuel into electric energy and one key challenge it has to face in commercialization applications is cold-hot cycle instability of the electrochemical performance and the mechanical performance. Therefore, in order to extend the service life of the SOFC and expand its application fields, it is necessary to systematically study the attenuation law of the electrochemical performance and the mechanical performance of the SOFC pile in the hot cycle process to unveil its potential degradation mechanism. This is highly significant to improve the hot cycle stability of the SOFC pile.

In order to overcome the shortcomings of the prior arts, the present disclosure provides a prediction method of electrochemical and mechanical performances of an SOFC in a cold-hot cycle.

In order to achieve the above object, the present disclosure employs the following technical solution: there is provided a prediction method of electrochemical and mechanical performances of an SOFC in a cold-hot cycle, which includes the following steps: at step S1, preparing composition materials of an SOFC pile, completing assembling and test preparation work of an SOFC pile power generation and test system, and determining operation parameters of a cold-hot cycle test of the SOFC pile based on actual service working condition; at step S2, by using the SOFC pile power generation and test system, carrying out the cold-hot cycle test, and by using an electronic load controller and an electrochemical workstation, collecting a polarization curve and an electrochemical impedance spectroscopy of the SOFC pile during each cold-hot cycle operation; at step S3, by using a distribution of relaxation time method and an equivalent circuit model, performing analysis and fitting processing on electrochemical impedance spectroscopy data of the SOFC pile and calculating a voltage loss resulting from each electrode reaction process of the SOFC and a contribution value to voltage attention in the cold-hot cycle; at step S4, testing a mechanical performance of cells in the SOFC pile after different numbers of cold-hot cycle services; at step S5, by using scanning electron microscope and X-ray energy dispersive spectrometer, analyzing a micro-structural change law of composition of each part of the SOFC pile after and before the cold-hot cycle test, and calculating a content and an average particle diameter of each element in the SOFC pile; at step S6, disclosing an attenuation coupling relationship of the electrochemical performance and the mechanical performance of the SOFC pile and building an attenuation theory model of the electrochemical performance and the mechanical performance of the SOFC pile; at step S7, predicting the electrochemical performance and the mechanical performance of the SOFC pile after different numbers of cold-hot cycles and a cold-hot cycle service life of the SOFC pile.

Preferably, in the step S1, the SOFC pile power generation and test system comprises the SOFC pile, the electronic load controller, the electrochemical workstation, a gas controller, a temperature controller, and a data control terminal; the cells in the SOFC pile comprise a cathode, a barrier layer, an electrolyte, an anodic functional layer and a anodic support layer, and with a bipolar plate and an encapsulation material, the cells are assembled into one pile unit; multiple pile units are assembled together and fixed by a sealing material, a top plate, a base and bolts to form one SOFC pile with a large power; the electronic load controller is configured to adjust a load, change a current of the SOFC pile and record voltage responses under different currents; the electrochemical workstation is configured to generate an alternating current signal desired by the electrochemical impedance spectroscopy test and measure an impedance change of the SOFC pile under different frequencies; the gas controller is configured to control supply of fuel gas and oxidant and maintain a gas flowrate and a pressure desired by the pile in the test process; the temperature controller is configured to heat or cool the SOFC pile, and monitor an operation temperature of the SOFC pile; by cables, an electrode of the SOFC pile is connected to the electronic load controller and the electrochemical workstation, and data interfaces of the electronic load controller and the electrochemical workstation are connected by cables to the data control terminal to carry out data synchronization and remote control; when voltage test is performed, the electronic load controller may adjust the current and the data control terminal can record the voltage response of the SOFC pile; when electrochemical impedance spectroscopy test is performed, a signal generator of the electrochemical workstation may apply an alternating current signal of small amplitude to the pile while measuring an impedance response signal of the SOFC pile, and then obtain an electrochemical impedance spectroscopy diagram by an electrochemical analysis software in the data control terminal; the operation parameters of the SOFC pile in the cold-hot cycle test comprise a temperature range, heating and cooling rates, a gas type, the gas flowrate, a cycle frequency, a number of cycles and a current density; the range of a working temperature is 650° C. to 800° C., the range of a reduction temperature is 700° C. to 900° C., the heating rate is 0.5 to 2° C./min, the cooling rate is 0.5 to 1° C./min; pure hydrogen and dry air are used as fuel and oxidant respectively, and nitrogen is used as a protective gas; in a heating process, dry nitrogen is supplied to an anode at the gas flowrate of 0.3 to 0.9 L/min, hydrogen is supplied to the anode at the gas flowrate of 0.3 to 0.9 L/min, and dry air is supplied to a cathode at the gas flowrate of 0.9 to 2.7 L/min.

Preferably, in the step S2, the SOFC pile power generation and test system is used to set the cold-hot cycle temperature range and the heating-cooling rate of the SOFC pile, set cathode and anode-side gas supply programs of the SOFC pile, heat the SOFC pile from room temperature to the reduction temperature for reduction, and after the reduction, cool the pile to the working temperature and start up the SOFC pile to start the cold-hot cycle test; by the electronic load controller, the polarization curve of the SOFC pile during each cold-hot cycle is collected, and an attenuation rate of the SOFC pile under the current density A1 is calculated, where a reference range of the current density A1 is 0 to 500 mA/cm$^2$; by using the electronic load controller and the electrochemical workstation, the electrochemical impedance spectroscopy data of the SOFC pile during each cold-hot cycle service under 3 to 5 direct current biases is collected. The direct current bias refers to that the SOFC pile is enabled to maintain a constant direct current output by the electronic load controller to simulate a loaded operation state of the SOFC in an actual power generation process.

Preferably, in the step S3, by using the distribution of relaxation time method, the electrochemical impedance spectroscopy data in the cold-hot cycle process is processed, and based on the characteristics of the SOFC pile in different electrochemical reaction processes, peaks on a distribution of relaxation time diagram are distinguished to qualitatively distinguish a change law of different electrode reaction processes; based on the distribution law obtained by the distribution of relaxation time method, the electrode reaction processes are determined and a reasonable initial value is provided for an element of the equivalent circuit model; the equivalent circuit model formed by ohmic impedance $R_{ohm}$, inductance L and RQ unit is used to fit the electrochemical impedance spectroscopy data, quantitatively determine contributions of different electrode reaction processes to the voltage attenuation in the cold-hot cycle and determine a contribution value of each electrode reaction process to the voltage attenuation as well as ranking; in the distribution of relaxation time method, a total impedance $Z(\omega)$ of the SOFC pile represents a sum of the ohmic impedance $R_{ohm}$ and a polarization impedance $R_{pol}$; the relaxation time t refers to a time required for the electrochemical process to achieve an equilibrium state; wherein the polarization impedance represents an integral of the relaxation time t from 0 to ∞ seconds; the expression of the total impedance $Z(\omega)$ is shown below:

$$Z(\omega) = R_{ohm} + R_{pol} = R_{ohm} + \int_0^\infty \frac{\gamma(\ln \tau)}{1 + j\omega\tau} d \ln \tau; \quad (1)$$

where j and ω are an imaginary unit and an angular frequency; by solving $\gamma(\tau)$ corresponding to different relaxation times τ, the distribution of relaxation time diagram corresponding to the Electrochemical Impedance Spectroscopy (EIS) data is obtained, with the expression of the $\gamma(\tau)$ shown below:

$$\gamma(\tau) = \frac{R}{2\pi} \cdot \frac{\sin[(1-n)\pi]}{\cosh[n \ln(\tau/\tau_0)] - \cos[(1-n)\pi]}; \quad (2)$$

wherein R is resistance, cosh is hyperbolic cosine function, n is an electron transfer number, $\tau_0$ is a relaxation time at an initial moment;

$$f = \frac{1}{2\pi\tau}; \quad (3)$$

the characteristic frequency f is expressed below: in the equivalent circuit model, the equivalent circuit module is formed by series-connected ohmic impedance $R_{ohm}$, inductance L and RQ unit, where the RQ unit is formed by parallel-connecting the resistance R and a constant phase element (CPE), and each RQ unit represents an electrode process on a specific time scale; the total impedance of the equivalent circuit model is calculated in the following formula:

$$Z(\omega) = R_{ohm} + 2j\pi fL_{self} + 2\pi fL_{wire} + \sum \frac{R}{1 + (j\omega\tau)^\alpha} + \sum \frac{R}{\sqrt{1 + j\omega\tau}}; \quad (4)$$

where $L_{self}$ is a self-inductance of the equivalent circuit, $L_{wire}$ is an imaginary mutual inductance, and $L_{wire}$ is used to reduce interference of the inductance and mutual inductance on an analysis result.

Preferably, in the step S4, the SOFC pile is taken down after the cold-hot cycle, and the mechanical performance of each composition part of the cells is analyzed; the mechanical performance of the cells comprises a bending strength, an elastic modulus, and a hardness; the bending strength is tested by a small punch tester, and the elastic modulus and the hardness are tested by high-precision nano-indenter; before the small punch test, the cells are processed by laser cutting into circular sheet specimens of diameter of 10 mm and the cell specimens of each type undergo more than 20 small punch tests; a dispersivity of the bending strength of the cells is analyzed by Weibull statistics method; before nano-indentation test, the cross section of the cells is polished to produce a flat surface.

Preferably, in the step S5, microstructure and element distribution of each composition part of the cells after different numbers of cold-hot cycles are studied by scanning electron microscope and X-ray energy dispersive spectrometer, and a size of element particles in each electrode is calculated from images of the scanning electron microscope (SEM) and the X-ray energy dispersive spectrometer (EDS) by using an image processing software ImageJ; by area weighted algorithm, an average equivalent circular diameter $\varphi_{ECD}$ of Ni element particles in specimens of the cells after and before the cold-hot cycles is calculated.

Preferably, in the step S6, based on the change law of the SOFC output voltage, the bending strength of the cells, the average equivalent circular diameter $\varphi_{ECD}$ of Ni element particles, the elastic modulus and the hardness along with the number of cold-hot cycles, an theory model showing the attenuation coupling of the electrochemical performance and the mechanical performance of the SOFC pile is built:

$$y = \frac{-\sqrt{C}}{n} \cdot \ln(x) + C; \quad (5)$$

where y is a parameter value of any performance of the SOFC output voltage, the bending strength of the cells, the average equivalent circular diameter $\varphi_{ECD}$ of the Ni element particles, the elastic modulus and the hardness; x is a number of cold-hot cycles, wherein x≥1 and is a positive integer; C is an initial value of any performance of the SOFC output voltage, the bending strength of the cells, the average equivalent circular diameter $\varphi_{ECD}$ of the Ni element particles, the elastic modulus and the hardness; the specific value of Cis obtained by test in the first cold-hot cycle; n is an attenuation coefficient.

Preferably, in the step S7, a failure threshold of the electrochemical performance and the mechanical performance of the SOFC pile is defined as 20% to 80%, and based on the theory model in the step S6, the cold-hot cycle service life of the SOFC pile is predicted.

The present disclosure has the following beneficial effects: the present disclosure provides a prediction method of electrochemical and mechanical performances of an SOFC in a cold-hot cycle, which can effectively direct the operation and maintenance of the SOFC pile in the cold-hot cycle service and reduce the economic loss to accelerate the research and development period and develop a low-cost SOFC pile with highly cold-hot-tolerant cycle service so as to push the commercialization application of the SOFC. The present disclosure has the main advantages as below: 1. the decline of the electrochemical performance of the SOFC pile under the cold-hot cycle service working condition results from the weakening interaction of the components of the pile and degradation of the components themselves of the pile. Further, it is difficult to accurately distinguish the mechanism affecting the degradation of the electrochemical performance of the SOFC pile. In the present disclosure, based on the polarization curve, the measurement and analysis of the electrochemical impedance spectroscopy, the distribution of relaxation time method and the equivalent circuit model, the contributions of different electrode reaction processes of the SOFC pile to the voltage attenuation in the cold-hot cycle can be quantitatively determined.

2. The critical challenge the SOFC has to face for its commercialization is the cold-hot cycle instability of the electrochemical performance and the mechanical performance. In the present disclosure, based on the change of Ni particles in the cold-hot cycle process, the electrochemical performance and the mechanical performance (bending strength, elastic modulus and hardness) of the SOFC pile are quantitatively associated, such that the attenuation coupling relationship of electrochemical performance and the mechanical performance of the SOFC pile is unveiled and the theory model showing the attenuation of the SOFC output voltage and the mechanical performance in the cold-hot cycle service process is built, which is of great significance to improve the thermal shock resistance of the cold-hot cycle of the SOFC pile.

BRIEF DESCRIPTIONS OF THE DRAWINGS

DETAILED DESCRIPTIONS OF EMBODIMENTS

The present disclosure will be further detailed below in combination with drawings and specific embodiments. The Solid Oxide Fuel Cell (SOFC) is an efficient energy conversion device capable of directly converting chemical energy in fuel into electric energy and one key challenge it has to face in commercialization applications is cold-hot cycle instability of the electrochemical performance and the mechanical performance. Therefore, in order to extend the service life of the SOFC and expand its application fields, it is necessary to systematically study the attenuation law of the electrochemical performance and the mechanical performance of the SOFC pile in the hot cycle process to unveil its potential degradation mechanism. This is highly significant to improve the hot cycle stability of the SOFC pile.

In the present disclosure, a prediction method of electrochemical and mechanical performances of an Solid Oxide Fuel Cell (SOFC) in a cold-hot cycle, in which the electrochemical attenuation mechanism of the SOFC pile is analyzed by polarization curve, electrochemical impedance spectroscopy (EIS) and distribution of relaxation time (DRT). By using small punch test (SPT) and nano indentation test, a change law of cells in mechanical performance (bending strength, elastic modulus and hardness) along with cold-hot cycle is analyzed. Anode Ni particles suffer from substantive degradation such as coarsening, migration and depletion and so on in the cold-hot cycle, which will not only lower a conductivity and an output voltage of the SOFC but also result in micro-cracks and defects inside the anode materials, lowering the bending strength and stability of the anode. Therefore, the electrochemical performance and the mechanical performance of the SOFC pile is quantitatively associated by using Ni particle change in the present disclosure.

Figure 1:
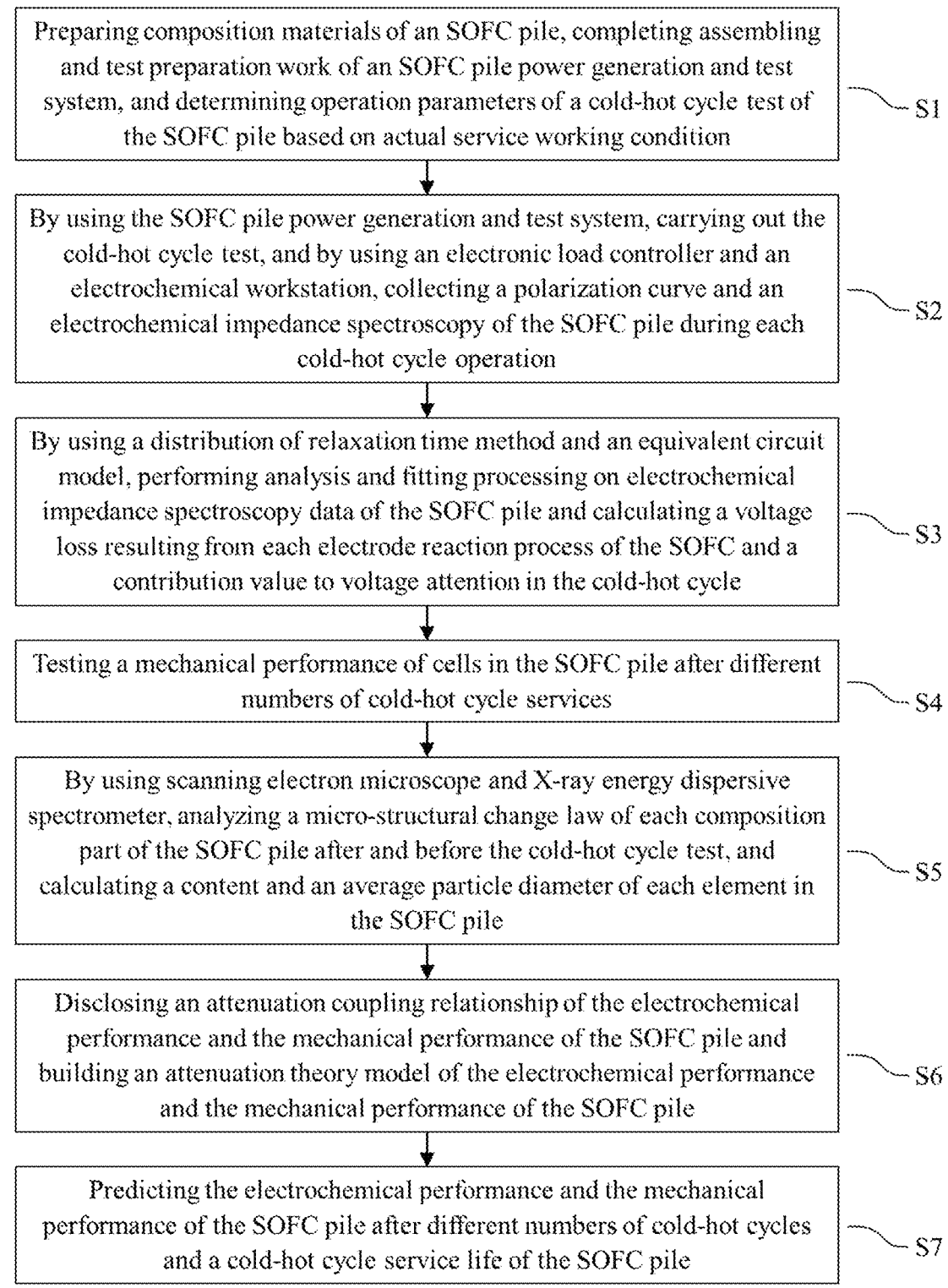
FIG. 1 is a flowchart illustrating a method of the present disclosure.

There is provided with a prediction method of electromechanical and mechanical performances of an SOFC in cold-hot cycle with its flow shown in FIG. 1. The prediction method comprises the following steps: at step S1, composition materials of an SOFC pile are prepared, assembling and test preparation work of an SOFC pile power generation and test system are completed, and operation parameters of a cold-hot cycle test of the SOFC pile are determined based on actual service working condition.

Figure 2:
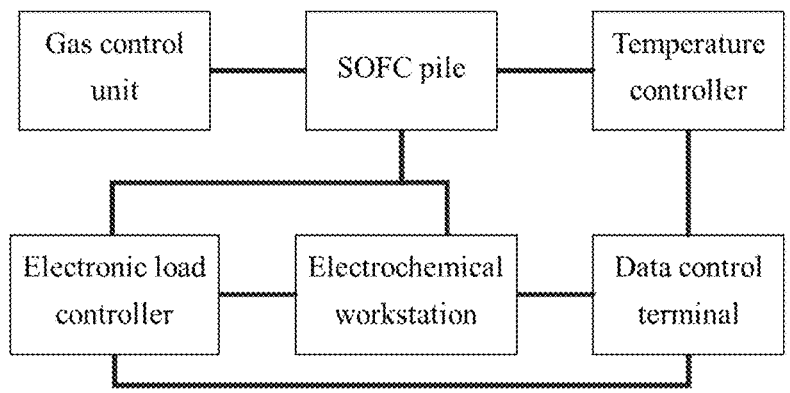
FIG. 2 is a schematic diagram illustrating component devices and connection manner of an SOFC pile power generation and test system.

As shown in FIG. 2, the SOFC pile power generation and test system comprises the SOFC pile, an electronic load controller, an electrochemical workstation, a gas controller, a temperature controller, and a data control terminal; the cells in the SOFC pile comprise a cathode, a barrier layer, an electrolyte, an anodic functional layer and a anodic support layer, and with a bipolar plate and an encapsulation material, the cells are assembled into one pile unit; multiple pile units are assembled together and fixed by a sealing material, a top plate, a base and bolts to form one SOFC pile with a large power; the electronic load controller is configured to adjust a load, change a current of the SOFC pile and record voltage responses under different currents; the electrochemical workstation is configured to include a signal generator to generate a desired alternating current signal for EIS test and measure an impedance change of the SOFC pile under different frequencies; the gas controller is configured to control supply of fuel gas an oxidant and maintain a gas flowrate and a pressure desired by the pile in the test process; the temperature controller is configured to heat or cool the SOFC pile, and monitor an operation temperature of the SOFC pile; by cables, an electrode of the SOFC pile is connected to the electronic load controller and the electrochemical workstation, and data interfaces of the electronic load controller and the electrochemical workstation are connected by cables to the data control terminal to carry out data synchronization and remote control; when voltage test is performed, the electronic load controller may adjust the current and the data control terminal can record the voltage response of the SOFC pile; when electrochemical impedance spectroscopy test is performed, the signal generator of the electrochemical workstation may apply an alternating current signal of small amplitude to the pile while measuring an impedance response signal of the SOFC pile, and then obtain an electrochemical impedance spectroscopy diagram by an electrochemical analysis software in the data control terminal.

Figure 3:
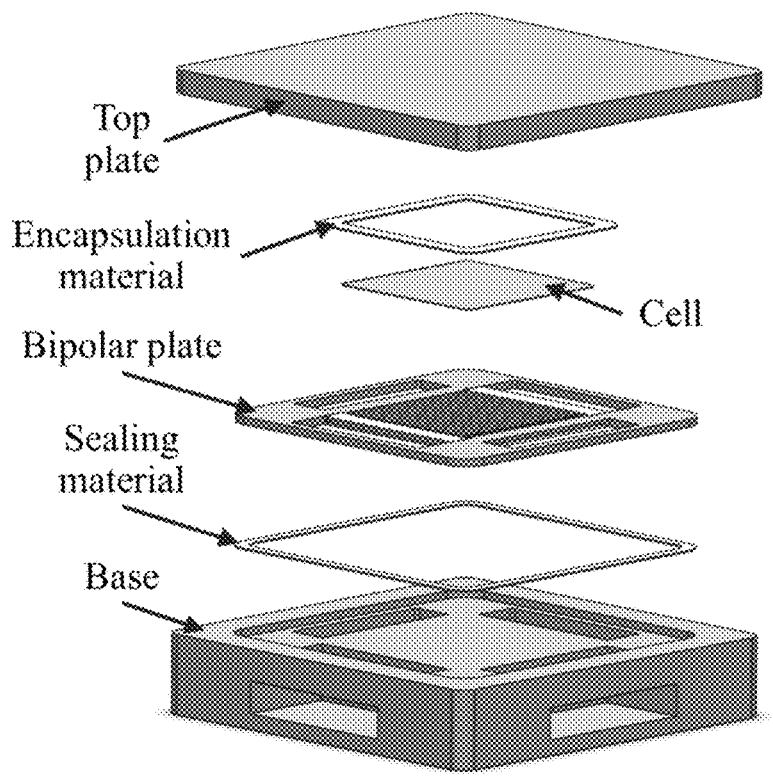
FIG. 3 is a structural schematic diagram illustrating an SOFC pile.
Figure 4:
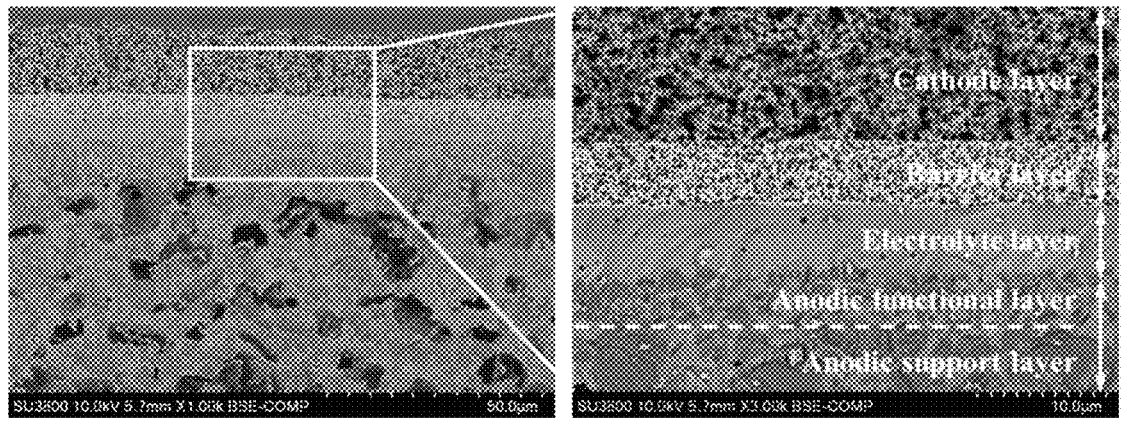
FIG. 4 is a structural schematic diagram illustrating a cross section of a cell in an SOFC pile.

In the present disclosure, one single-cell SOFC pile formed of one cell of 120×120 mm$^2$ is prepared, with its effective activity response area being 100×100 mm$^2$. The structure of the SOFC pile is as shown in FIG. 3, and the structure of the section of the cell in the SOFC pile is as shown in FIG. 4. The materials of the Anodic Support Layer (ASL) and the Anodic Functional Layer (AFL) are both Ni-YSZ, with thicknesses being 400 to 500 μm and 8 to 10 μm respectively. The material of the electrolyte is YSZ with a thickness of 8 to 10 μm. The material of the barrier layer is GDC with a thickness of 5 to 10 μm. The material of the cathode is LSC, with a thickness of 20 to 30 μm. The Crofer 22 APU stainless steel is used to manufacture the metallic bipolar plate. A silver net as a cathode gas distributor and a current collector is disposed between the cathode and the bipolar plate. The glass ceramic sealing material is used in the SOFC pile to maintain airtightness between the cell and the bipolar plate.

Before the cold-hot cycle test, the SOFC pile is mounted in an electric heating furnace and gradually heated to a reduction temperature and a working temperature, and then assessed for its power generation performance. The heating rate of 1° C./min and the cooling rate of 0.5° C./min are used in the cold-hot cycle of the SOFC pile, with the circulation temperature between room temperature and 750° C. Pure hydrogen and dry air are used as fuel and oxidant respectively and nitrogen is used as a protective gas. During a heating process, dry nitrogen is supplied to the anode at the flowrate of 0.5 L/min. After the temperature reaches 750° C., hydrogen is supplied to the anode at the flowrate of 0.5 L/min, and dry air is supplied to the cathode at the flowrate of 1.5 L/min. After completion of the test, cooling is performed to room temperature at the cooling rate of 0.5° C./min to complete one cycle process. In this embodiment, the SOFC pile undergoes a total of 10 cold-hot cycle tests.

At step S2, by using the SOFC pile power generation and test system, the cold-hot cycle test is carried out, and by using the electronic load controller and the electrochemical workstation, a polarization curve and an electrochemical impedance spectroscopy of the SOFC pile at the time of each cold-hot cycle operation are collected.

Figure 5:
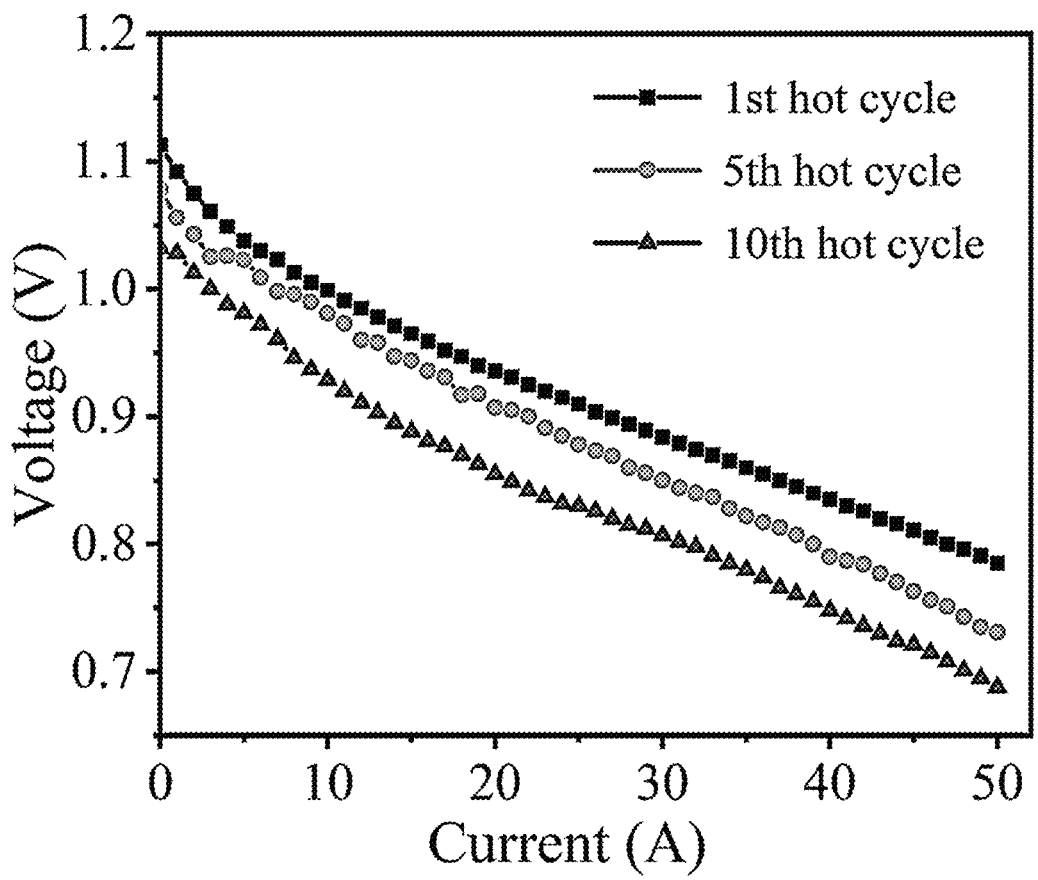
FIG. 5 is a schematic diagram illustrating an I-V-P curve of an SOFC pile during a cold-hot cycle test.
Figure 6:
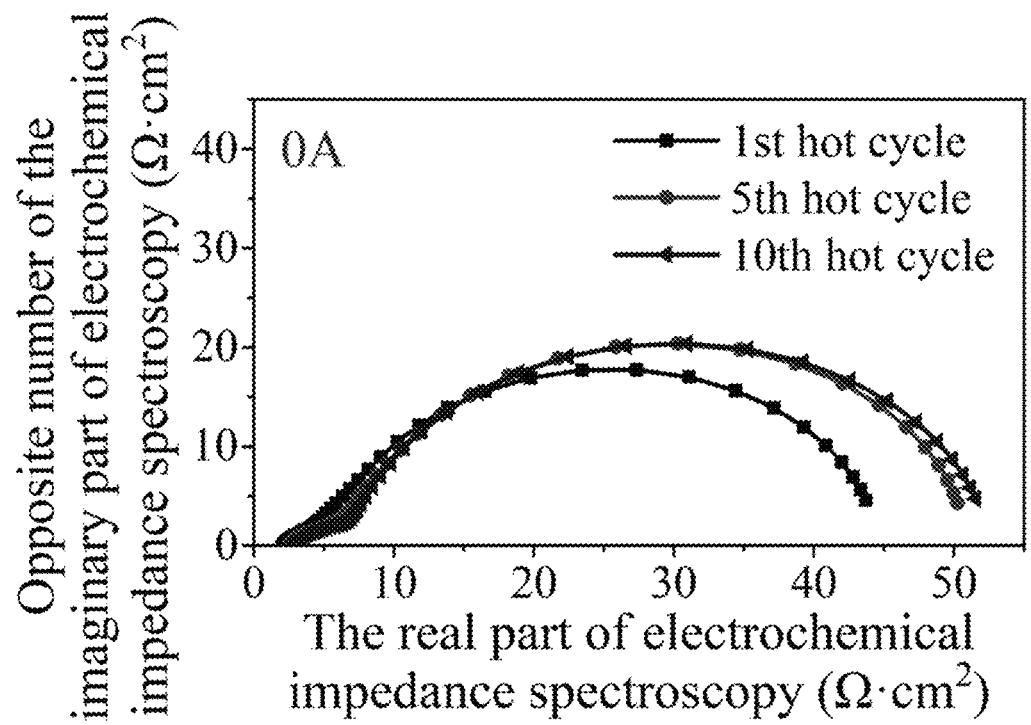
FIG. 6 is a Nyquist diagram of an SOFC pile under 0A direct current bias in a cold-hot cycle process.

By using ITECH IT8511 programmable direct current electronic load controller, the current density of the SOFC from 0 mA/cm$^2$ to 500 mA/cm$^2$, i.e. the polarization curve under 0A to 50A, is measured, as shown in FIG. 5. When the SOFC pile serves from the first cold-hot cycle to the tenth cold-hot cycle, the attenuation rate of the output voltage under the current density of 500 mA/cm$^2$ reaches 12.36%. By using the ITECH IT8511 programmable direct current electronic load controller and Gamry Reference 3000AE electrochemical workstation, the electrochemical impedance spectroscopy data of the SOFC pile under the five direct current biases 0A, 10A, 20A, 30A, 40A in the cold-hot cycle process is collected. The direct current bias refers to that the SOFC is enabled to maintain a constant direct current output by using the electronic load controller, with its main purpose of simulate a loaded operation state of the SOFC in a practical power generation process. The Nyquist data under the direct current bias 0A is as shown in FIG. 6. The ohmic impedance $R_{ohm}$ (the left intercept on the abscissa axis Zre in FIG. 6) arising from pure charge transfer and the polarization impedance $R_{pol}$ (difference between the right intercept and the left intercept on the abscissa axis Zre in FIG. 6) arising from diffusion and electrochemical reaction and the like can be clearly distinguished therefrom. $R_{ohm}$ growth rate subsequent to the tenth cold-hot cycle reaches 33.65% and $R_{pol}$ growth rate is 10.16% as minimum.

At step S3, by using a distribution of relaxation time (DRT) method and an equivalent circuit model (ECM), analysis and fitting processing are performed on the electrochemical impedance spectroscopy (EIS) data of the SOFC pile and a voltage loss resulting from each electrode reaction process of the SOFC and a contribution value to voltage attention in the cold-hot cycle are calculated.

Figure 7:
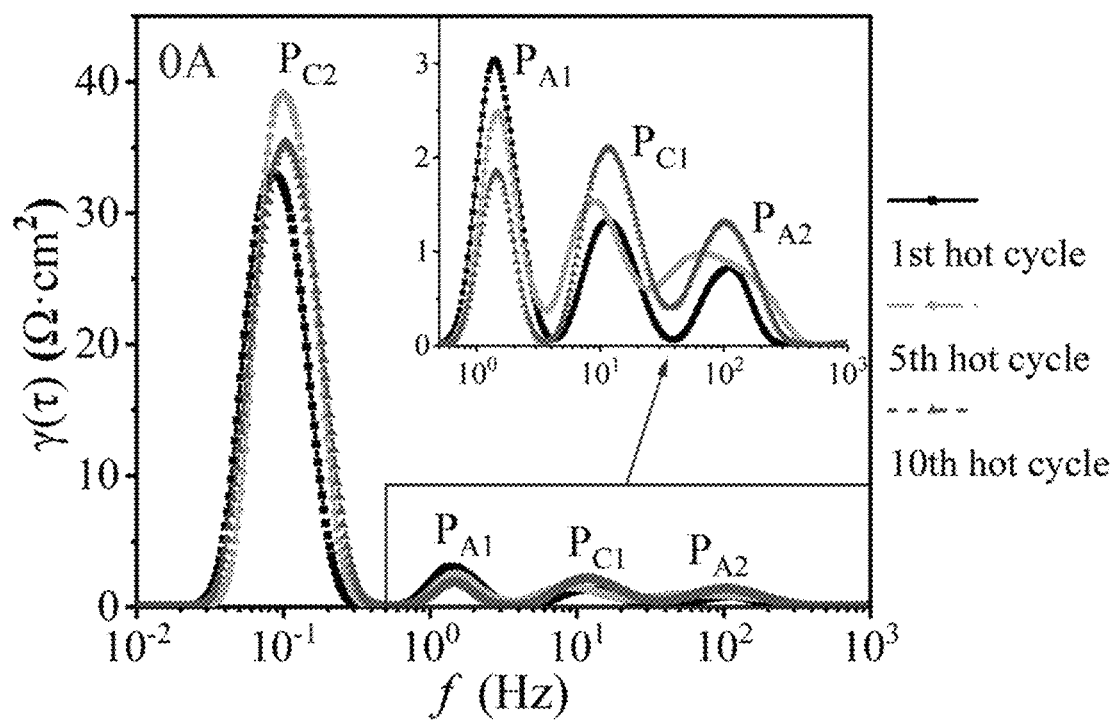
FIG. 7 is a DRT diagram illustrating an SOFC pile under 0A direct current bias in a cold-hot cycle process.

The DRT method is an advanced method for analyzing electrochemical impedance spectroscopy (EIS) data. This method is applicable to processing the impedance data of complex electrochemical systems, especially when the electrode process of the systems includes processes of multiple time scales. In the distribution of relaxation time method, the total impedance $Z(\omega)$ of the SOFC pile represents a sum of the ohmic impedance $R_{ohm}$ and the polarization impedance $R_{pol}$; the relaxation time $\tau$ refers to a time required for the electrochemical process to achieve an equilibrium state; where the polarization impedance represents an integral of the relaxation time $\tau$ from 0 to co seconds; the expression of the total impedance $Z(\omega)$ is shown below:

$$Z(\omega) = R_{ohm} + R_{pol} = R_{ohm} + \int_0^\infty \frac{\gamma(\ln \tau)}{1 + j\omega\tau} d \ln \tau; \quad (1)$$

where j and $\omega$ are an imaginary unit and an angular frequency; by solving $\gamma(\tau)$ corresponding to different relaxation times $\tau$, the distribution of relaxation time diagram corresponding to the Electrochemical Impedance Spectroscopy (EIS) data is obtained, with the expression of the $\gamma(\tau)$ shown below:

$$\gamma(\tau) = \frac{R}{2\pi} \cdot \frac{\sin[(1-n)\pi]}{\cosh[n \ln(\tau/\tau_0)] - \cos[(1-n)\pi]}; \quad (2)$$

wherein R is resistance, cosh is hyperbolic cosine function, n is an electron transfer number, $T_0$ is a relaxation time at an initial moment; the characteristic frequency fis expressed below:

$$f = \frac{1}{2\pi\tau}; \quad (3)$$

the EIS data is processed under five direct current biases 0A, 10A, 20A, 30A, 40A in the cold-hot cycle process. DRT calculation is performed on the EIS data by using the open-source software EISART compiled by Tsinghua University. Based on the characteristics of the SOFC pile in different electrochemical reaction processes, peaks on the DRT diagram are distinguished. The DRT evolution result under the direct current bias 0A is as shown in FIG. 7. For the SOFC structure in the present disclosure, four characteristic peaks can be distinguished out in single DRT diagram, where the characteristic peak $P_{A1}$ (100 to 1000 Hz) corresponds to charge transfer response and ion transportation close to a triple phase boundary (TPB) on the anode. The characteristic peak $P_{C1}$ (10 to 100 Hz) corresponds to cathode-side $O_2$ surface exchange kinetics and $O_2^-$ diffusion. The characteristic peak $P_{A2}$ (1 to 10 Hz) corresponds to anode gas-phase diffusion and conversion. The characteristic peak $P_{C2}$ (0.1 to 1 Hz) corresponds to cathode gas-phase diffusion and conversion. Under the direct current bias 0A, the peak $P_{A1}$, after the 10th cold-hot cycle, increases from 0.826 $\Omega\cdot cm^2$ to 1.308 $\Omega\cdot cm^2$, with an increase rate of 58.42%. Furthermore, the peak $P_{C1}$ corresponding to cathode-side oxygen reduction reaction kinetics, after the 10th cold-hot cycle, also increases by 57.77%. The change law of different electrode reaction processes can be distinguished by DRT, and a reasonable initial value is provided for the ECM fitting.

In the equivalent circuit model, the equivalent circuit module is formed by series-connected ohmic impedance $R_{ohm}$, inductance L and RQ unit, where the RQ unit is formed by parallel-connecting the resistance R and a constant phase element (CPE), and each RQ unit represents an electrode process on a specific time scale. The total impedance of the equivalent circuit model is calculated in the following formula:

$$Z(\omega) = R_{ohm} + 2j\pi fL_{self} + 2j\pi fL_{wire} + \sum \frac{R}{1 + (j\omega\tau)^\alpha} + \sum \frac{R}{\sqrt{1 + j\omega\tau}}; \quad (4)$$

where $L_{self}$ is a self-inductance of the equivalent circuit, $L_{wire}$ is an imaginary mutual inductance, and $L_{wire}$ is used to reduce interference of the inductance and mutual inductance on an analysis result.

Figure 8:
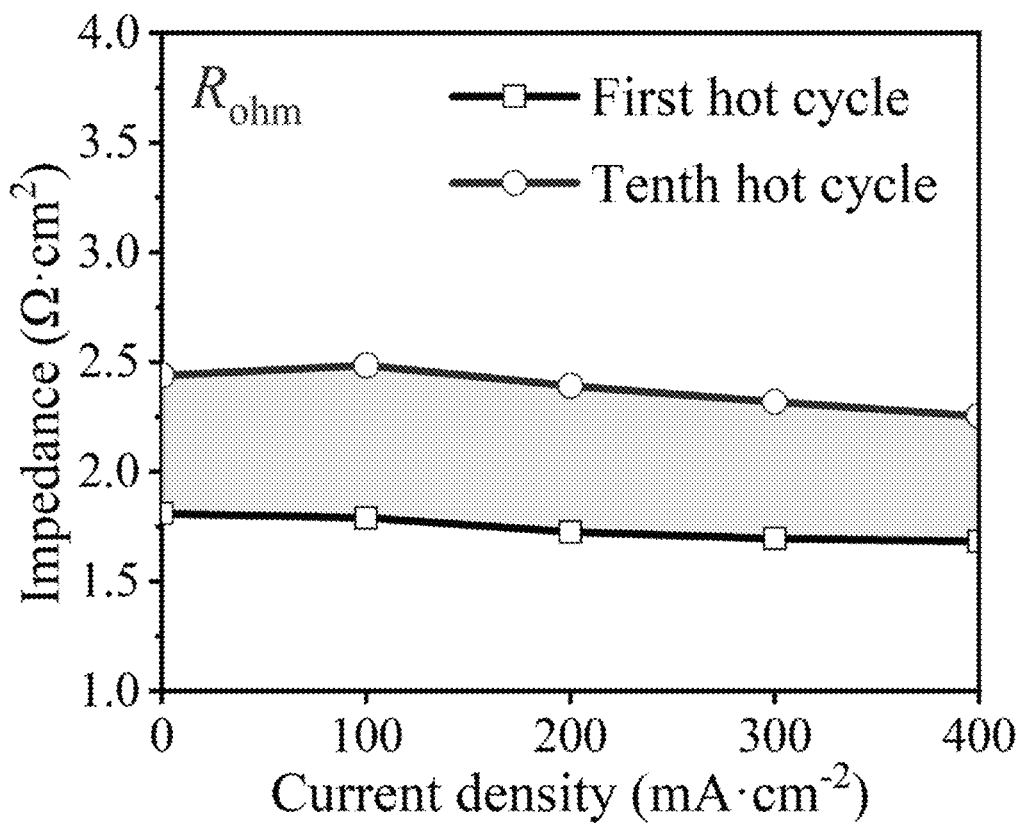
FIG. 8 is a schematic diagram illustrating an ECM fitting result of an ohmic impedance in the first to tenth cold-cycles.

Based on the distribution law of the DRT curve, four electrode reaction processes are determined. In this embodiment, the EIS data is fitted by using the ECM formed by ohmic impedance ($R_{ohm}$), inductance (L) and four RQ units. The ECM fitting result of the ohmic impedance ($R_{ohm}$) is as shown in FIG. 8. The area of the shadow region in the drawing represents overpotential increase resulting from the ohmic impedance from the first to tenth cold-hot cycles, namely, the voltage loss resulting from the ohmic impedance in the 10th cold-hot cycle.

Figure 9:
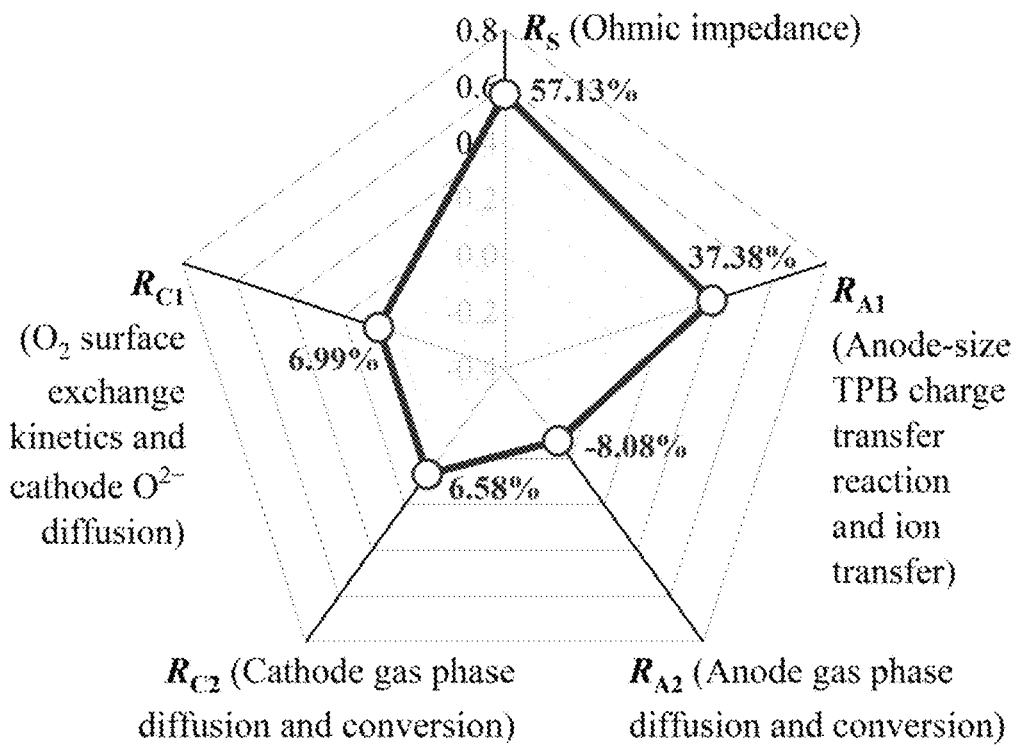
FIG. 9 is a schematic diagram illustrating a percentage of contribution of each electrode reaction process to voltage attenuation in the first to tenth cold-hot cycles.

By ECM fitting result, the contributions of different electrode reaction processes to the voltage attenuation in the cold-hot cycle are determined, as shown in FIG. 9. The degradation of the Room (ohmic impedance) dominates in the entire degradation, with its contribution rate of 57.13%. The second contribution comes from $R_{A1}$ (anode-side TPB charge transfer reaction and ion transportation), with the contribution rate of 37.38%. The contribution rate of $R_{C1}$ ($O_2$ surface exchange kinetics and cathode $O_2^-$ diffusion) is 6.99%. The contribution rate of $R_{C2}$ (cathode gas-phase diffusion and conversion) is 6.58%. The contribution rate of $R_{A2}$ (anode gas-phase diffusion and conversion) is negative (−8.08%). The sequence of the contributions of the electrode reaction processes to the voltage attenuation is $R_S > R_{A1} > R_{C1} > R_{C2} > R_{A2}$.

At step S4, the mechanical performance of the cells in the SOFC pile after different numbers of cold-hole cycle services is tested.

The mechanical performance of the cells includes a bending strength, an elastic modulus and a hardness. The bending strength is tested by small punch test (SPT) carried out by a small punch tester, and the elastic modulus and the hardness are tested by high-precision nano indenter.

1) The test of the bending strength of the cells: before the SPT test, the cells are processed by laser cutting into sheet-like specimens with a diameter of 10 mm, and then polished. In order to increase the reliability of the test result of the bending strength, each type of cell specimens undergo more than 20 SPT tests, and the dispersivity of the bending strength is analyzed by using Weibull statistics method. The thicknesses of the anodic support layer and the function layer take more than 95% of the total thickness of the cells, and the influence of the cathode, the barrier layer and the electrolyte on the bending strength of the cells is limited. Therefore, with the anode as the main basis of analysis of the bending strength of the cells, an average value of the bending strength of the cells after different numbers of cold-hot cycles is obtained through test, as shown in Table 1. The initial bending strength of the cells reaches 306.54 MPa, and gradually declines along with progress of the cold-hot cycle, and the attenuation rate of the bending strength after 10 cold-hot cycles reaches 54.14%.

TABLE 1 average value of bending strength of cells after different numbers of cold-hot cycles

| Number of cold-hot cycles | Average value of bending strength/MPa |
|---|---|
| 0 | 306.54 |
| 1 | 225.01 |
| 2 | 191.14 |
| 3 | 177.10 |
| 5 | 164.07 |
| 7 | 150.09 |
| 10 | 140.33 |

Figure 10:
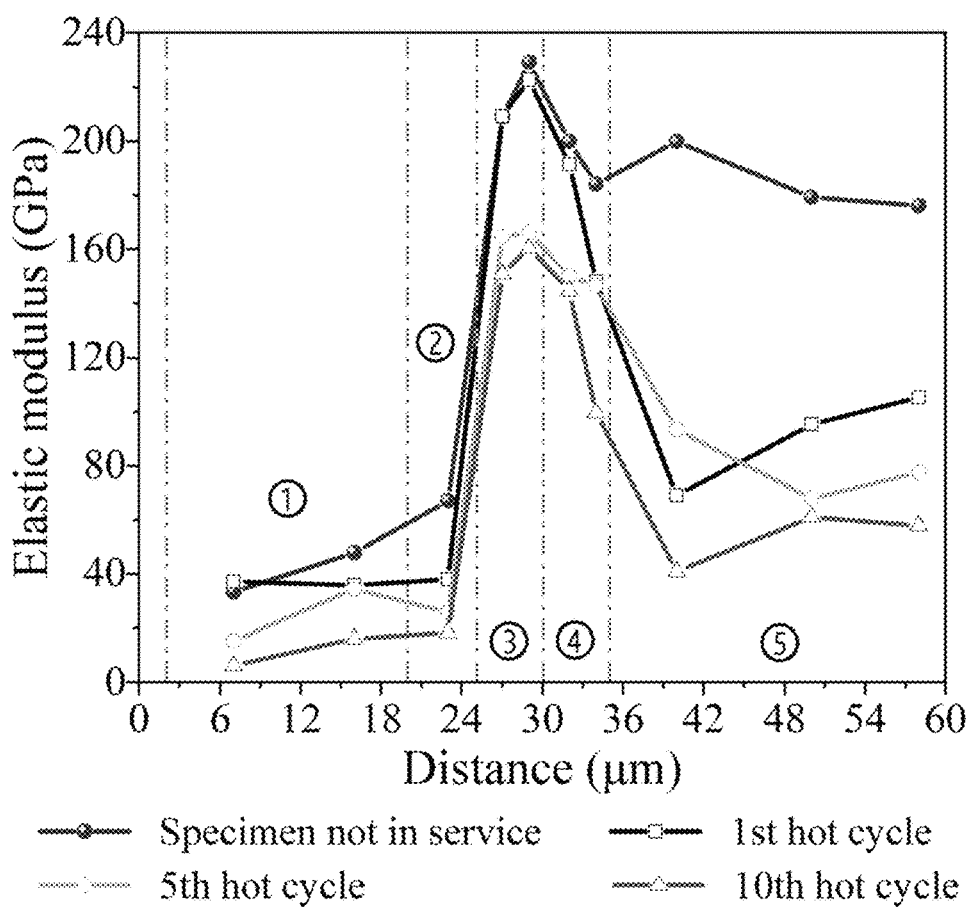
FIG. 10 is a schematic diagram illustrating an elastic modulus of each composition part of a cell after different numbers of cycles.
Figure 11:
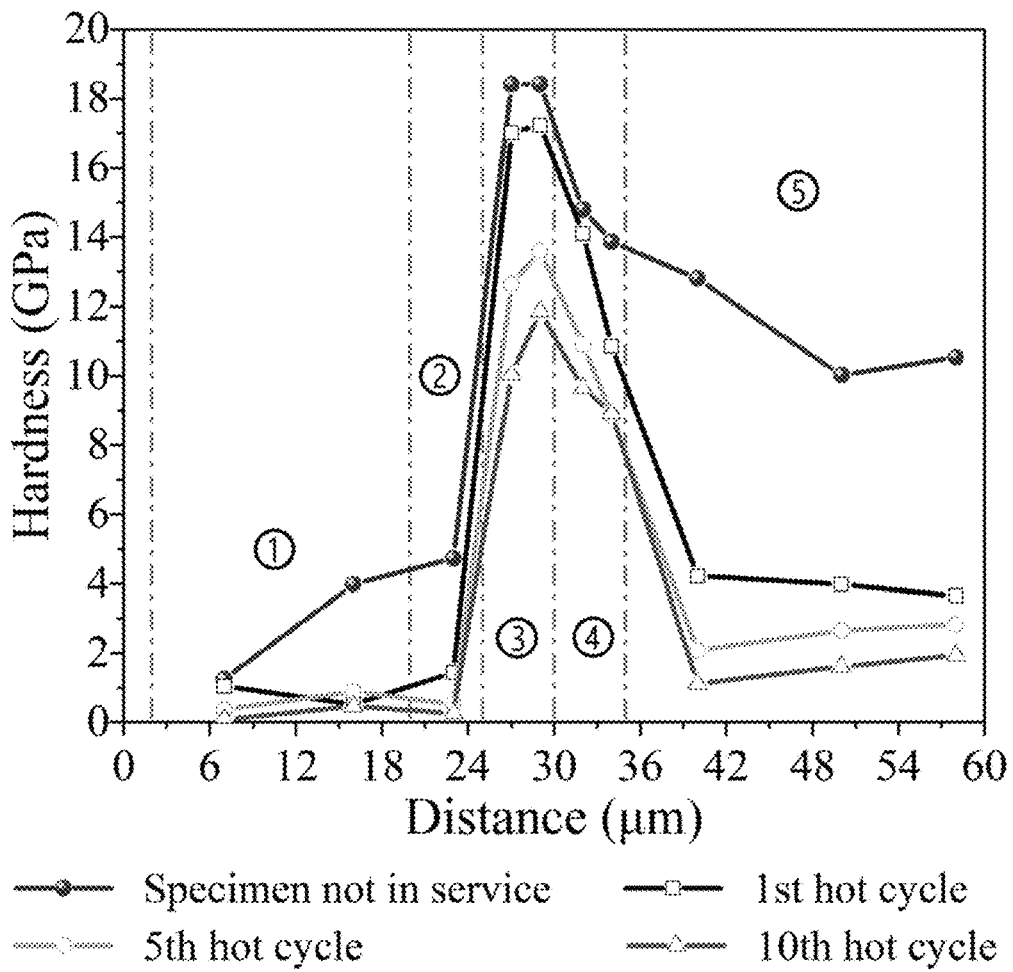
FIG. 11 is a schematic diagram illustrating a hardness of each composition part of a cell after different numbers of cycles; where ① is a cathode, ② is a barrier layer, ③ is an electrolyte layer, ④ is an anodic functional layer, and ⑤ is anodic support layer.

2) Test of the elastic modulus and hardness of each composition part of the cells: before nano indentation test, the cross section of the cells formed by cathode/barrier layer electrolyte/AFL/ASL is polished by 0.5 µm diamond suspension to obtain a flat surface. In the nano indentation test process, the peak load is 20 mN with a loading time of 20 seconds, and then unloaded in 20 seconds. The elastic modulus and the hardness of each composition part of the cells after different numbers of cycles are as shown in FIGS. 10 and 11. The elastic modulus and the hardness of the cells in each state have a distribution law of firstly increasing and then decreasing along a test path. The maximum values of the elastic modulus and the hardness of the specimens not in service both appear at the position of electrolyte, with the average values being 219.08 GPa and 18.41 GPa respectively. The minimum values are 40.57 GPa and 2.62 GPa respectively, and located on the cathode of the cells. For the elastic modulus, the attenuation rates of the anodic support layer and the barrier layer after 10 cold-hot cycles respectively reach 73.38% and 72.60%; the attenuation rate of the cathode also reaches more than 66.5%, and the attenuation rate of the electrolyte is minimum and only at 25.56%. For the hardness, the attenuation rates of the anodic support layer and the barrier layer after 10 cold-hot cycles respectively reach 87.83% and 94.35%, and the attenuation rate of the cathode also reaches more than 78.44%, and the attenuation rate of the electrolyte also reaches 40.51%.

At step S5, by using scanning electron microscope and X-ray energy dispersive spectrometer, a micro-structural change law of the composition material of the SOFC pile after and before the cold-hot cycle test is analyzed, and a content and an average particle diameter of each element in the SOFC pile is calculated.

After the cold-hot cycles of the SOFC pile, the pile is taken down and morphology assessment is performed on the cells. A change law of microstructure and element distribution of different regions of the SOFC cells are studied by scanning electron microscope and X-ray energy dispersive spectrometer (EDS), and a size of element particles in each electrode after and before the cold-hot cycles is calculated from images of the SEM and EDS in S5 by using an image processing software ImageJ. The Ni particles of various types in the SOFC anode after different numbers of cycles have the proportions as shown in Table 2. The size of the Ni particles of the anode before and after cold-hot cycles is calculated for the EDS image by using the ImageJ software. By area weighted algorithm, the average equivalent circular diameter ($\varphi_{ECD}$) of the Ni particles of the specimens not in service is calculated as 1.257 µm, and after 10 cold-hot cycles, the diameter increases to 1.739 µm. Based on equivalent circular diameter of the nickel particles, large-particle-size particles (LPSPs, $3<\varphi_{ECD}<10$ µm), medium-particle-size particles (MPSPs, $1<\varphi_{ECD}<3$ µm) and small-particle-size particles (SPSPs, $0<\varphi_{ECD}<1$ µm) can be clearly identified. In the specimens not in service, the quantity ratio of SPSPs reaches 66.67% as highest, that of LPSPs is 1.88% as minimum, and that of MPSPs reaches 30.05%. The ratio of the SPSPs gradually decreases along with the progress of the cold-hot cycles, and to 40.72% at the time of the 10th cold-hot cycle. The change law of the MPSPs is totally contrary, and its ratio, after 10 cold-hot cycles, increases from 30.05% to 48.50%.

TABLE 2

Ratios of the Ni particles of various types of the SOFC anode after different numbers of cycles

| Number of cold-hot cycles | Equivalent circular diameter of Ni particles | | |
|---|---|---|---|
| | LPSPs ($3 < \varphi_{ECD} < 10$ µm) | MPSPs ($1 < \varphi_{ECD} < 3$ µm) | SPSPs ($0 < \varphi_{ECD} < 1$ µm) |
| 0 | 1.88% | 30.25% | 66.67% |
| 1 | 0.75% | 34.21% | 65.04% |
| 5 | 7.86% | 41.20% | 50.94% |
| 10 | 10.78% | 48.50% | 40.72% |

At step S6, an attenuation coupling relationship of the electrochemical performance and the mechanical performance of the SOFC pile is disclosed and an attenuation theory model of the electrochemical performance and the mechanical performance of the SOFC pile is built.

Figure 12:
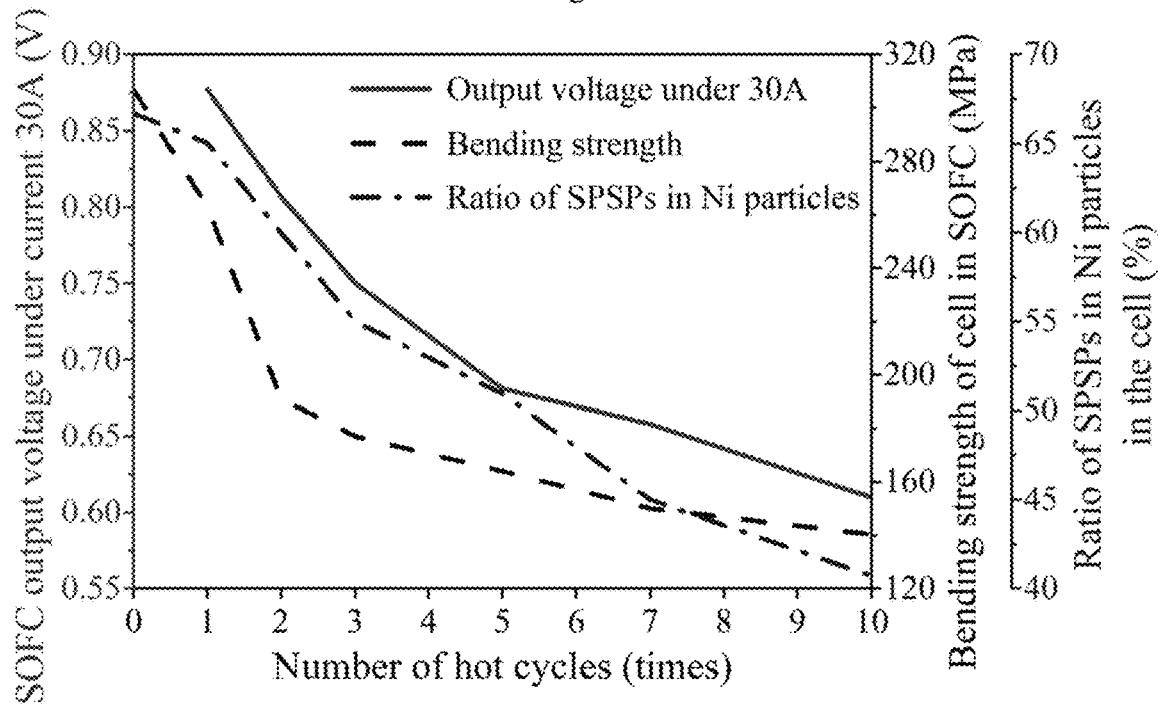
FIG. 12 is a schematic diagram illustrating a change curve of an SOFC voltage, a bending strength, and an SPSPs proportion in Ni particles along with cold-hot cycle.
Figure 13:
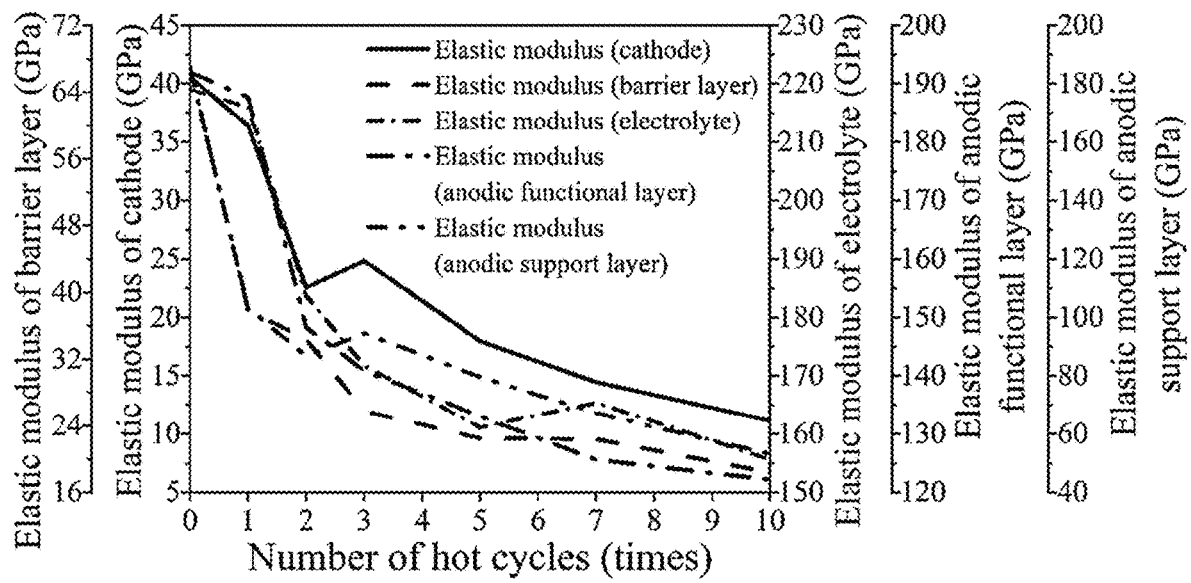
FIG. 13 is a schematic diagram illustrating a change curve of an SOFC elastic modulus along with cold-hot cycle.
Figure 14:
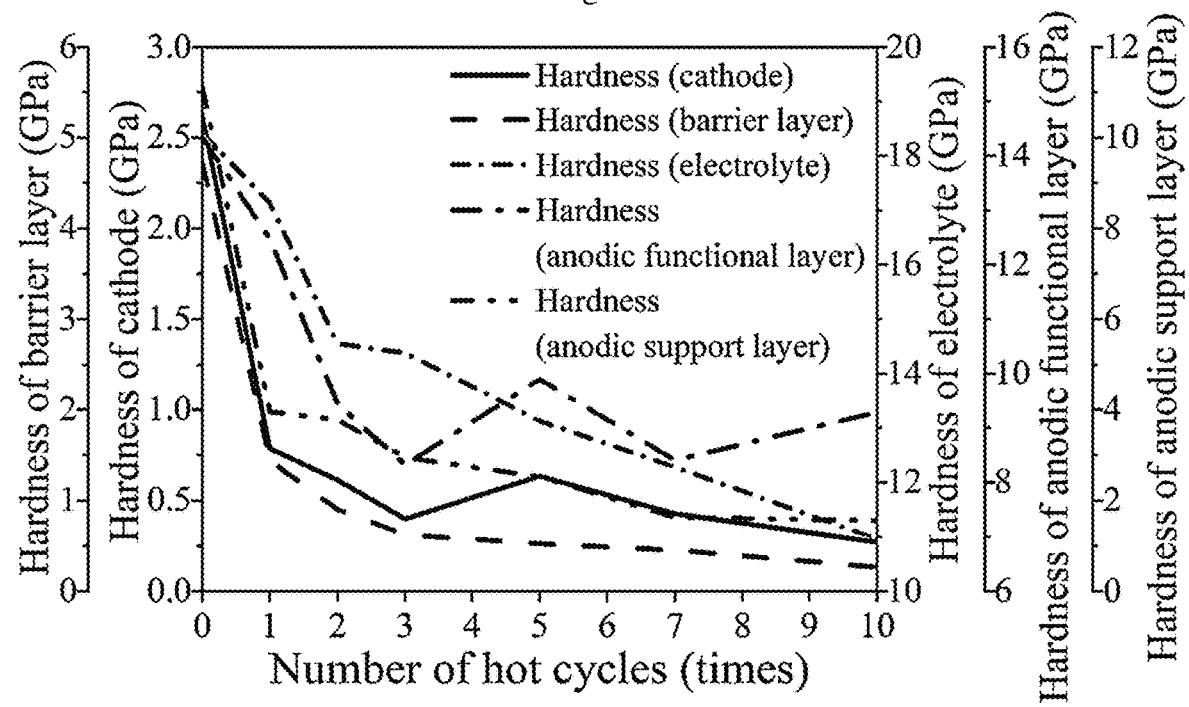
FIG. 14 is a schematic diagram illustrating a change curve of an SOFC hardness along with cold-hot cycle.

In the cold-hot cycles, anode Ni particles suffer from substantive degradation such as coarsening, migration and depletion and so on, which will not only affect the SOFC anode-size conductivity and electrochemical stability, but also cause structural problems more easily in the service process. The change curve of the SOFC output voltage, the bending strength of the cells, the elastic modulus and the hardness along with the cold-hot cycles is as shown in FIGS. 12, 13 and 14. It can be seen that the change law of the SOFC output voltage, the bending strength of the cells, the average equivalent circular diameter $\varphi_{ECD}$ of Ni element particles, the elastic modulus and the hardness along with the number of cold-hot cycles is in compliance with the logarithmic form. Therefore, by using a logarithmic formula, the theory model showing the change of the SOFC electrochemical and mechanical performances and microstructure under the cold-hot cycles can be built, with the theory model formula as below:

$$y = \frac{-\sqrt{C}}{n} \cdot \ln(x) + C; \quad (5)$$

where y is a parameter value of any performance of the SOFC output voltage, the bending strength of the cells, the average equivalent circular diameter $\varphi_{ECD}$ of the Ni element particles, the elastic modulus and the hardness; x is a number of cold-hot cycles, wherein x≥1 and is a positive integer; C is an initial value of any performance of the SOFC output voltage, the bending strength of the cells, the average equivalent circular diameter $\varphi_{ECD}$ of the Ni element particles, the elastic modulus and the hardness; the specific value of C is obtained by test in the first cold-hot cycle; n is an attenuation coefficient.

The fitting value of the attenuation coefficient n of the electrochemical and mechanical performance curve of the SOFC in the cold-hot cycle service can be obtained by test as shown in FIG. 3. It can be seen that the value of the attenuation coefficient n corresponding to the bending strength of the cells is minimum and only at 0.414, which means the attenuation in the initial stage of the cold-hot cycles is the severest and later gradually slows down. Secondly, the value of the attenuation coefficient n corresponding to the elastic modulus of each composition part of the cells is 0.500 to 0.709. The value of the attenuation coefficient n corresponding to the current density 300 mA/cm², i.e. to the output voltage under 30A, is the maximum, and at 8.018, where its attenuation curve drops most slowly.

TABLE 3

Fitting values of the attenuation coefficients n of the electrochemical and mechanical performance curve

| Structure | Performance | Attenuation coefficient (n) |
|---|---|---|
| SOFC | Output voltage under 300 mA/cm² | 8.018 |
|  | Bending strength of cells | 0.414 |
| Cathode | Elastic modulus | 0.575 |
|  | Hardness | 4.813 |
| Barrier layer | Elastic modulus | 0.709 |
|  | Hardness | 2.410 |
| Electrolyte layer | Elastic modulus | 0.592 |
|  | Hardness | 1.659 |
| Anodic functional layer | Elastic modulus | 0.500 |
|  | Hardness | 2.757 |
|  | Ratio of SPSPs in Ni particles | 0.791 |
| Anodic support layer | Elastic modulus | 0.515 |
|  | Hardness | 1.760 |
|  | Ratio of SPSPs in Ni particles | 0.791 |

Figure 15:
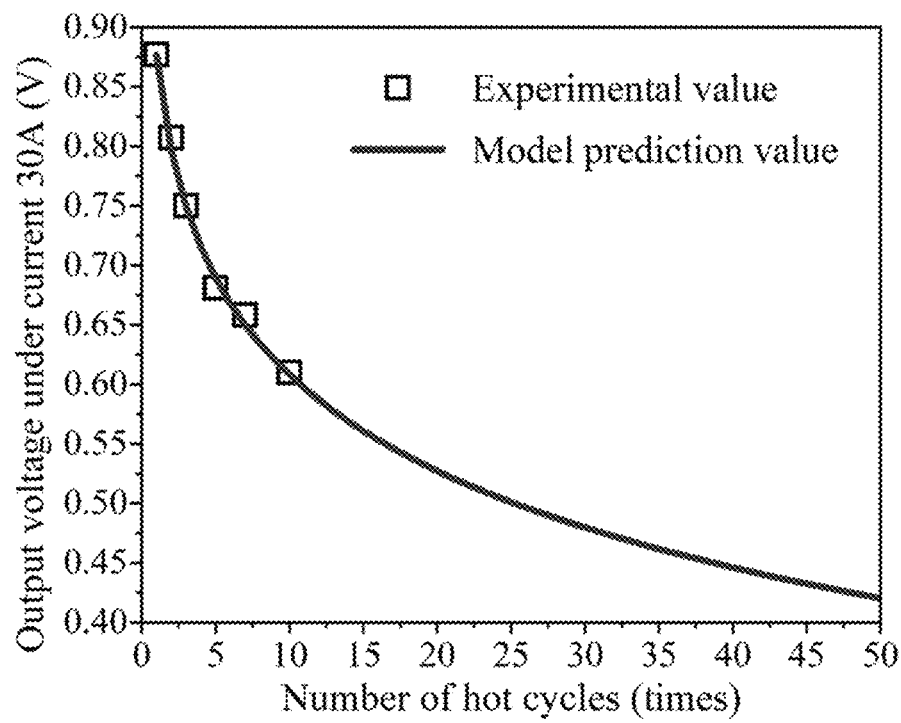
FIG. 15 is a schematic diagram illustrating comparison of experimental value and model value of an output voltage.
Figure 16:
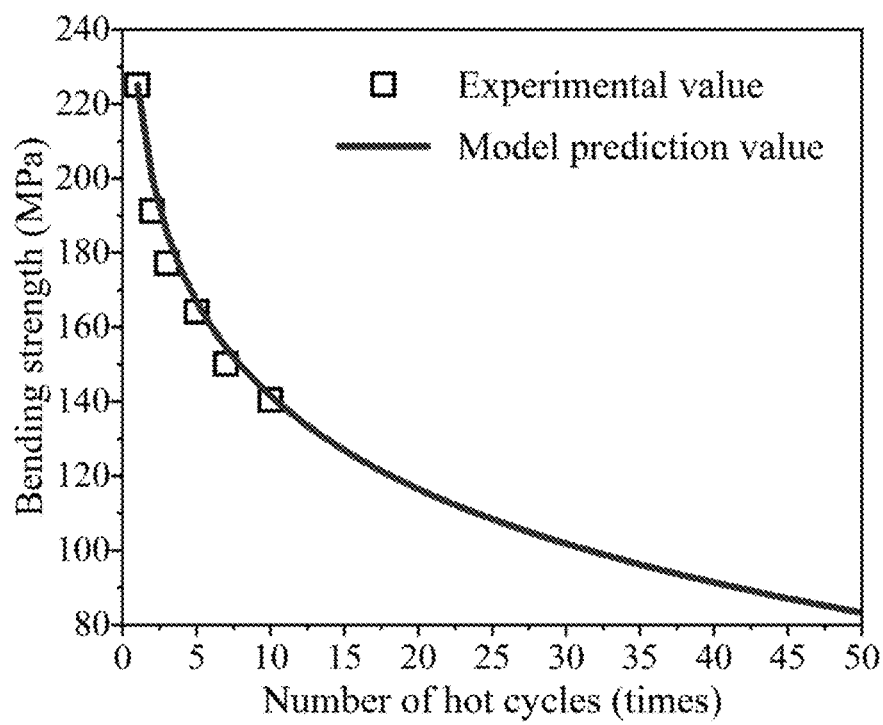
FIG. 16 is a schematic diagram illustrating comparison of experimental value and model value of a bending strength.

The comparison of the experimental value and the model value of the output voltage and the bending strength of cells is as shown in FIGS. 15 and 16. With the output voltage and the bending strength of cells under 30A as example, it can be known that the experimental value is well consistent with the model calculation value obtained in the formula (4).

At step S7, the electrochemical performance and the mechanical performance of the SOFC pile after different numbers of cold-hot cycles and a cold-hot cycle service life of the SOFC pile are predicted.

Due to the difference of the SOFC electrochemical performance and the mechanical performance, when the SOFC electrochemical performance declines to 505 of the initial performance, the low power generation efficiency will bring down the economic benefits of the SOFC device. Further, when the SOFC mechanical performance fails to 50%, it indicates that severe mechanical damage occurs inside the SOFC and may further affect the electrochemical performance of the SOFC pile. Therefore, the failure threshold of the electrochemical performance and the mechanical performance of the SOFC pile is defined as 50%. With the output voltage under 300 mA/cm² as example, when the output voltage of the SOFC pile under 300 mA/cm² attenuates to 50% of the output voltage of the first cold-hot cycle, it is considered that the life of its electrochemical performance comes to an end. With the bending strength of the cells as example, when the bending strength of the cells in the SOFC pile attenuates to 50% of the bending strength of the first cold-hot cycle, it is considered that the life of the electrochemical performance comes to an end.

Based on the theory model in step S6 and the failure threshold, prediction is performed on the electrochemical performance and the mechanical performance of the SOFC pile to obtain as 42 times the cold-hot cycle life of the output voltage of the SOFC pile under 300 mA/cm², and obtain as 22 times the cold-hot cycle life of the bending strength of the cells in the SOFC pile. Through comprehensive analysis, the cold-hot cycle life of the SOFC pile can be obtained as 22 times.

Of course, the above descriptions are not intended to limit the present disclosure and not limited to the above embodiments. All changes, variations, additions or substitutions made by those skilled in the arts within the essence scope of the present disclosure shall all fall within the scope of protection of the present disclosure.

The invention claimed is:

1. A prediction method of electrochemical performance and mechanical performance of a Solid Oxide Fuel Cell (SOFC) in a cold-hot cycle, comprising the following steps:

at step S1, preparing composition materials of an SOFC pile, completing assembling and test preparation work of an SOFC pile power generation and test system, and determining operation parameters of a cold-hot cycle test of the SOFC pile based on actual service working condition;

at step S2, by using the SOFC pile power generation and test system, carrying out the cold-hot cycle test of the SOFC, and by using an electronic load controller and an electrochemical workstation, collecting a polarization curve and an electrochemical impedance spectroscopy of the SOFC pile during each cold-hot cycle test;

at step S3, by using a distribution of relaxation time method and an equivalent circuit model, performing analysis and fitting processing on electrochemical impedance spectroscopy data of the SOFC pile and calculating voltage losses resulting from each of electrochemical reaction processes of the SOFC and contribution values to voltage attenuations in the cold-hot cycles;

at step S4, testing a mechanical performance of cells in the SOFC pile after different numbers of cold-hot cycle services;

at step S5, by using scanning electron microscope and X-ray energy dispersive spectrometer, analyzing a micro-structural change law of each composition part of the SOFC pile after and before the cold-hot cycle test of the SOFC, and calculating a content and an average particle diameter of each element in the SOFC pile;

at step S6, disclosing an attenuation coupling relationship of the electrochemical performance and the mechanical performance of the SOFC pile and building an attenuation theory model of the electrochemical performance and the mechanical performance of the SOFC pile;

based on a change law of a SOFC output voltage, a bending strength of the cells in the SOFC pile, an average equivalent circular diameter $\varphi_{ECD}$ of Ni element particles, an elastic modulus and a hardness along with a number of cold-hot cycles, a theory model showing the attenuation coupling relationship of the electrochemical performance and the mechanical performance of the SOFC pile is built:

$$y = \frac{-\sqrt{C}}{n} \cdot \ln(x) + C; \quad (5)$$

wherein y is a parameter value of any performance of the SOFC output voltage, the bending strength of the cells in the SOFC pile, the average equivalent circular diameter $\varphi_{ECD}$ of the Ni element particles, the elastic modulus and the hardness; x is a number of cold-hot cycles, wherein x≥1 and is a positive integer; C is an initial value of any performance of the SOFC output voltage, the bending strength of the cells in the SOFC pile, the average equivalent circular diameter $\varphi_{ECD}$ of the Ni element particles, the elastic modulus and the hardness; the specific value of C is obtained by test in the first cold-hot cycle; n is an attenuation coefficient; and at step S7, predicting the electrochemical performance and the mechanical performance of the SOFC pile after different numbers of cold-hot cycles and a cold-hot cycle service life of the SOFC pile;

wherein in the step S3, by using the distribution of relaxation time method, the electrochemical impedance spectroscopy data in the cold-hot cycle process is processed, and based on characteristics of different electrochemical reaction processes in the SOFC pile, peaks on a distribution of relaxation time diagram are distinguished to qualitatively distinguish a change law of different electrochemical reaction processes; based on a relaxation time distribution law obtained by the distribution of relaxation time method, the electrochemical reaction processes are determined and a reasonable initial value is provided for an element of the equivalent circuit model; the equivalent circuit model formed by ohmic impedance $R_{ohm}$, inductance L and RQ unit is used to fit the electrochemical impedance spectroscopy data, quantitatively determine contributions of different electrochemical reaction processes to a voltage attenuation in the cold-hot cycle and determine a contribution value of each electrochemical reaction process to the voltage attenuation as well as ranking;

in the distribution of relaxation time method, a total impedance Z(ω) of the SOFC pile represents a sum of the ohmic impedance $R_{ohm}$ and a polarization impedance $R_{pol}$; the relaxation time τ refers to a time required for the electrochemical reaction process to achieve an equilibrium state; wherein the polarization impedance represents an integral of the relaxation time τ from 0 to ∞ seconds; the expression of the total impedance Z(ω) is shown below:

$$Z(\omega) = R_{ohm} + R_{pol} = R_{ohm} + \int_0^\infty \frac{\gamma(\ln \tau)}{1 + j\omega\tau} d \ln \tau; \quad (1)$$

wherein j and ω are an imaginary unit and an angular frequency; by solving γ(τ) corresponding to different relaxation times τ, the distribution of relaxation time diagram corresponding to the electrochemical impedance spectroscopy data is obtained, with the expression of the γ(τ) shown below:

$$\gamma(\tau) = \frac{R}{2\pi} \cdot \frac{\sin[(1-n)\pi]}{\cosh[n \ln(\tau/\tau_0)] - \cos[(1-n)\pi]}; \quad (2)$$

wherein R is resistance, cosh is hyperbolic cosine function, n is an electron transfer number, $\tau_0$ is a relaxation time at an initial moment; a characteristic frequency f is expressed below:

$$f = \frac{1}{2\pi\tau}; \quad (3)$$

in the equivalent circuit model, the equivalent circuit model is formed by series-connected ohmic impedance $R_{ohm}$, inductance L and RQ unit, wherein the RQ unit is formed by parallel-connecting the resistance R and a constant phase element (CPE), and each RQ unit represents an electrode process on a specific time scale; the total impedance of the equivalent circuit model is calculated in the following formula:

$$Z(\omega) = R_{ohm} + 2j\pi f L_{self} + 2\pi f L_{wire} + \sum \frac{R}{1 + (j\omega\tau)^\alpha} + \sum \frac{R}{\sqrt{1 + j\omega\tau}}; \quad (4)$$

wherein $L_{self}$ is a self-inductance of the equivalent circuit, $L_{wire}$ is a mathematical compensation term for a mutual inductance, and $L_{wire}$ is used to eliminate a disturbance between the self-inductance and the mutual inductance in a calculation result of the equivalent circuit model.

2. The prediction method of the electrochemical performance and mechanical performance of the SOFC in the cold-hot cycle according to claim 1, wherein in the step S1, the SOFC pile power generation and test system comprises the SOFC pile, the electronic load controller, the electrochemical workstation, a gas controller, a temperature controller, and a data control terminal; the cells in the SOFC pile comprise a cathode, a barrier layer, an electrolyte, an anodic functional layer and a anodic support layer, and with a bipolar plate and an encapsulation material, the cells in the SOFC pile are assembled into one pile unit; multiple pile units are assembled together and fixed by a sealing material, a top plate, a base and bolts to form one SOFC pile with a large power; the electronic load controller is configured to adjust a load, change a current of the SOFC pile and record voltage responses under different currents; the electrochemical workstation is configured to generate an alternating current signal desired by an electrochemical impedance spectroscopy test and measure an impedance change of the SOFC pile under different frequencies; the gas controller is configured to control supply of fuel gas and oxidant and maintain a gas flowrate and a pressure desired by the pile in the test process; the temperature controller is configured to heat or cool the SOFC pile, and monitor an operation temperature of the SOFC pile; by cables, an electrode of the SOFC pile is connected to the electronic load controller and the electrochemical workstation, and data interfaces of the electronic load controller and the electrochemical workstation are connected by cables to the data control terminal to carry out data synchronization and remote control; and the operation parameters of the SOFC pile in the cold-hot cycle test of the SOFC comprise a temperature range, a heating rate, a cooling rate, a gas type, the gas flowrate, a cycle frequency, a number of cycles and a current density; the temperature range of a working temperature is 650° C. to 800° C., the temperature range of a reduction temperature is 700° C. to 900° C., the heating rate is 0.5 to 2° C./min, the cooling rate is 0.5 to 1° C./min; pure hydrogen and dry air are used as fuel and oxidant respectively, and nitrogen is used as a protective gas; in a heating process, dry nitrogen is supplied to an anode at the gas flowrate of 0.3 to 0.9 L/min, hydrogen is supplied to the anode at the gas flowrate of 0.3 to 0.9 L/min, and dry air is supplied to a cathode at the gas flowrate of 0.9 to 2.7 L/min.

3. The prediction method of the electrochemical performance and mechanical performance of the SOFC in the cold-hot cycle according to claim 1, wherein in the step S2, the SOFC pile power generation and test system is used to set a cold-hot cycle temperature range, the heating rate and the cooling rate of the SOFC pile, set cathode and anode-side gas supply programs of the SOFC pile, heat the SOFC pile from room temperature to a reduction temperature for reduction, and after the reduction, cool the pile to a working temperature and start up the SOFC pile to start the cold-hot cycle test of the SOFC; and by the electronic load controller, the polarization curve of the SOFC pile during each cold-hot cycle is collected, and an attenuation rate of the SOFC pile under the current density A1 is calculated, wherein a reference range of the current density A1 is 0 to 500 mA/cm$^2$; by using the electronic load controller and the electrochemical workstation, the electrochemical impedance spectroscopy data of the SOFC pile during each cold-hot cycle service under 3 to 5 direct current biases is collected.

4. The prediction method of the electrochemical performance and mechanical performance of the SOFC in the cold-hot cycle according to claim 1, wherein in the step S4, the SOFC pile is taken down after the cold-hot cycle, and the mechanical performance of each composition part of the cells in the SOFC pile is analyzed; the mechanical performance of the cells in the SOFC pile comprises a bending strength, an elastic modulus, and a hardness; the bending strength is tested by a small punch tester, and a dispersivity of the bending strength of the cells in the SOFC pile is analyzed by Weibull statistics method; the elastic modulus and the hardness are tested by high-precision nano-indenter.

5. The prediction method of the electrochemical performance and mechanical performance of the SOFC in the cold-hot cycle according to claim 1, wherein in the step S5, microstructure and element distribution of each composition part of the cells in the SOFC pile after different numbers of cold-hot cycles are studied by scanning electron microscope and X-ray energy dispersive spectrometer, and a size of element particles in each electrode is calculated from images of the scanning electron microscope and the X-ray energy dispersive spectrometer by using an image processing software ImageJ; by area weighted algorithm, an average equivalent circular diameter $\varphi_{ECD}$ of Ni element particles in specimens of the cells in the SOFC pile after and before the cold-hot cycles is calculated.

6. The prediction method of the electrochemical performance and mechanical performance of the SOFC in the cold-hot cycle according to claim 1, wherein in the step S7, a failure threshold of the electrochemical performance and the mechanical performance of the SOFC pile is defined as 20% to 80%, and based on the attenuation theory model in the step S6, the cold-hot cycle service life of the SOFC pile is predicted.

* * * * *